Patented Sept. 20, 1932

1,878,082

UNITED STATES PATENT OFFICE

WILLIAM H. WILLIAMS, OF MIDLAND, MICHIGAN, ASSIGNOR TO THE DOW CHEMICAL COMPANY, OF MIDLAND, MICHIGAN, A CORPORATION OF MICHIGAN

HYDRATED PHENYL PHENATE PRODUCT

No Drawing.  Application filed December 17, 1930. Serial No. 502,985.

This invention relates to improvements in methods for preparing the alkali metal salts of the phenyl phenols and to the novel products thereby obtained.

The aforesaid compounds have been prepared heretofore by crystallization from aqueous solution. Such method, which is applicable in a general way to the preparation of all of the compounds of the type in question, presents various difficulties, which greatly hinder the preparation of a product of high purity in commercially satisfactory yields. Owing to the very considerable solubility of these salts in water, they may be crystallized only from concentrated aqueous solutions, so that much salt remains dissolved in the mother liquor, and complete separation of mother liquor from crystals by filtration is extremely difficult. Furthermore, the salts hydrolyze in aqueous solution, forming the free phenols unless an excess of alkali is present. To wash the filtered crystals free from mother liquor and excess alkali results in excessive re-solution of the salt and a low yield of purified crystals. Another difficulty is due to the fact that these soluble phenyl phenates form series of hydrated forms containing probably 5, 3, 2, and 1 molecules of water of crystallization, the most highly hydrated of which is the form crystallized from aqueous solutions at ordinary temperature. The highly hydrated crystals directly obtained are not permanent in air, but lose water under usual humidity conditions to form lower hydrated forms of the salt. Of the lower hydrates the $3H_2O$ form is most stable and permanent in air under normal conditions, while the still lower hydrated forms when exposed to the air absorb water therefrom. It is difficult to prepare a uniform $3H_2O$ product, for example, by drying the crystals separated directly from aqueous solution, since very careful control is necessary to prevent simultaneous formation of lower hydrates, the presence of which in the dried crystal product causes it to absorb water when exposed to air, thereby leading to more or less caking or lumping of the material. The relative amount of free or excess alkali in the solution from which the hydrated phenate crystals are to be obtained is also important, for, if too little of the alkali is present, the phenyl phenate salt hydrolzes with the formation of free phenyl phenol, thereby producing in most strengths of solution a cloudy condition so that a satisfactory product is not obtained therefrom by crystallization. An excess of alkali, however, serves to stabilize the hydrated phenate, but crystals derived from solutions containing an excess of alkali can not be readily washed free from the alkali without being much dissolved and with the consequent formation of excessive quantities of wash water and mother liquor.

A method of preparing a soluble salt of a phenyl phenate which avoids or overcomes the difficulties and disadvantages enumerated is much to be desired. I have found that this may be accomplished in a highly satisfactory degree and a greatly superior product obtained by mixing a phenyl phenol with substantially the correct amount of an alkali metal hydroxide and water to make the desired hydrated salt, for instance, sodium ortho-phenyl phenate.$3H_2O$, sodium meta-phenyl phenate.$3H_2O$, potassium ortho-phenyl phenate.$3H_2O$, potassium meta-phenyl phenate.$1H_2O$, potassium meta-phenyl phenate.$2H_2O$, etc., at a temperature to maintain the product in a fused condition and then to prepare therefrom a solid product in the form of masses of desired size, or in divided, comminuted or flake form of such product, by complete solidification of such fused product whereby the production of mother liquors is avoided. The invention, then, consists of new products, the hydrated alkali metal phenyl phenates in comminuted or flake form, together with a method of making the same, the following description setting forth the steps employed in carrying out my invention as particularly pointed out in the claims.

In carrying out my invention, as previously indicated, a phenyl phenol is dissolved in an alkali metal hydroxide solution of such concentration that the resulting reaction product may consist substantially of a corresponding phenyl phenate salt, together with a water content corresponding to a given number (either whole or fractional) of molecules of water of crystallization. Such phenate thus prepared need contain no free hydroxide; however, in certain instances I may add a slight excess thereof, or as much even as ten per cent. The presence of relatively small amounts of free hydroxide in the finally prepared solid hydrated phenate is usually not detrimental to many of its uses in the arts, and, furthermore, such hydroxide when specified to be used with the phenate for many purposes may be conveniently incorporated in the product prepared according to my invention. The temperature of the reaction product is maintained at/or somewhat above the initial freezing point thereof, e. g. about 78° C., for the sodium ortho-phenyl phenate.3H$_2$O product, a temperature range of 80° to 120° C. being found most suitable. To carry out the flaking operation of my invention, an internally cooled drum is partly immersed in a bath of the hot reaction product as described above, or of the fused hydrated salt, and revolved, thus depositing a thin layer or film thereof upon the drum surface, which solidifies thereon by cooling and is then removed by means of a scraper or knife set in proper relation to the revolving drum. With the temperature of the molten reaction product as above specified the cooling water entering the flaking drum is preferably maintained at about 35° C. or lower. At lower temperatures the speed of the flaking drum may be increased with a proportionate increase in output of flake product. A preferred range of temperature for the detached flakes of such sodium ortho-phenyl phenate, however, lies between about 30° and 60° C. and may be conveniently regulated by varying the speed of the flaking drum, temperature of the cooling water or otherwise. The aforesaid specified conditions for carrying out my invention are, of course, particularly applicable to the 3H$_2$O hydrated ortho-phenyl phenate, as above specified; however, my invention may be similarly adapted to the other hydrated phenates of the same respectively, namely, 1H$_2$O, 2H$_2$O, 5H$_2$O or intermediate fractional water components and to the similar compounds of the alkali metals with other phenyl phenols, the following being a partial list of such other phenyl phenates with their approximate initial fusion points, respectively: potassium o-phenyl phenate.1H$_2$O, 87° C.; potassium o-phenyl phenate.2H$_2$O, 46.5° C.; potassium m-phenyl phenate.1H$_2$O, 39° C.; potassium m-phenyl phenate.2H$_2$O, 36° C.; sodium m-phenyl phenate.3H$_2$O, 104° C. With the initial fusion points given, in other instances than those stated in the following specific examples, suitable flaking conditions may be accordingly arranged.

The following examples will illustrate the steps employed in carrying out my invention:—

Example I

To make a sodium ortho-phenyl phenate product in flake form containing about three molecules of water of crystallization, the following procedure was carried out.

A nickel flaker drum 18 inches in diameter and with a 12 inch face was mounted in the usual way and revolved at a speed of about 4 R. P. M. in a bath of molten hydrated sodium ortho-phenyl phenate, which had been previously made up by dissolving 4000 lbs. of ortho-phenyl phenol in an aqueous sodium hydroxide solution consisting of 940 lbs. of flake NaOH dissolved in 850 lbs. of water, such bath being maintained at a temperature between about 80° and 100° C. The temperature of the detached flakes was between approximately 35° and 40° C. with a regulated inflow of cooling water at about 20° C. to the flaking drum. By regulating the speed of the drum as above, a flake product of about .03 inch in thickness was obtained and at a rate of 3¾ lbs. per minute. The hydrated sodium ortho-phenyl phenate thus flaked had a final liquefaction point of approximately 78° C.

Example II

For making a flake potassium ortho-phenyl phenate containing about two molecules of water of crystallization, a bath of molten potassium ortho-phenyl phenate was prepared by heating 4000 lbs. of ortho-phenyl phenol with an aqueous potassium hydroxide solution consisting of 1250 lbs. of KOH dissolved in 425 lbs. of water and the molten mixture flaked, employing the equipment described in Example I and in a similar manner, such bath being maintained at a temperature range between about 46.5° C. and 100° C. With the flaker drum revolving at a speed of 4 R. P. M. in the usual way, the flake product thus obtained had a thickness of .03 inch and was detached at a temperature of about 25° to 35° C., the cooling water to the flaking drum being regulated at a temperature of about 20° C. The potassium ortho-phenyl phenate thus obtained had a final liquefaction point of approximately 46.5° C. and was produced at the rate of about 4 lbs. per minute.

Example III

To make sodium meta-phenyl phenate in flake form containing about three molecules of water of crystallization, a bath of molten sodium meta-phenyl phenate was previously made up by dissolving 4000 lbs. of meta-phenyl phenol in an aqueous sodium hydroxide solution consisting of 940 lbs. of flake NaOH dissolved in 850 lbs. of water, and flaked in the usual manner employing the equipment used in Example I. The bath thus made was maintained at a temperature between approximately 104° and 120° C. By cooling the flaker drum with water at about 20° C. and rotating at a speed of 4 R. P. M. a flake product having a temperature range between about 40° and 50° C., .04 inch in thickness and at a rate of 5 lbs. per minute, was obtained. These flakes of sodium metaphenyl phenate had a final liquefaction point of about 104° C.

The flaking drum may be of various materials such as iron, copper, or other metals or combinations of metals; however, a flaking surface of nickel seems best suited to the purpose. In addition to use of the particular equipment specified above in carrying out my invention, other forms of apparatus of such type as a revolving belt system, etc., by use of which an equivalent result might be obtained, may be used in practicing my invention. Various accessory equipment such as heaters, evaporators, coolers, conveyors, and the like may be found useful in numerous ways in carrying out my process. The flaking drum or belt or other equipment, or the layer of phenate, may also be cooled by a current of air or by other means.

Instead of flaking I may prepare the solid hydrated phenates by other methods, e. g. the fused reaction product or fused hydrated salt may be solidified by cooling with suitable stirring whereby a granular or divided form of the solid may be obtained; or again, such hot liquid material may be solidified by cooling in the form of chunks, blocks, slabs, pigs, etc., and thereafter crushed to the desired degree of comminution, but in whatever manner the final solid comminuted product or the final solid mass is prepared, there will be no mother liquors to handle, the yield will approximate theoretical and, if desired, a product having substantially no excess alkali may be prepared, whereas such product may not be prepared by crystallization without producing free phenol as an impurity and objectionable accompanying ingredient of the product.

It is manifest that crystals of the hydrated alkali metal salts of phenyl phenate such as the $3H_2O$ product or the other hydrated phenate crystals may be first obtained and separated and subsequently fused alone, or may be mixed with an alkali metal hydroxide or a phenyl phenol and solidified or flaked according to my invention. In contrast to the usual processes of crystallization for obtaining the present compound, wherein a considerable amount of mother liquor is necessarily obtained, which requires added expense and extensive equipment for reworking the same, in carrying out my invention no mother liquors result and only a minimum of equipment is needed, a materially reduced inventory suffices and numerous other advantages will be apparent to those skilled in the art of chemical manufacture. In addition, it is feasible to prepare a product substantially free from excess alkali, such not being practically feasible to prepare by crystallization from solution.

I further point out, however, that varying amounts of excess alkali may be used, if desired, to produce a given result, such as to prevent hydrolysis of the phenate if the same is to be used subsequently in aqueous solution. Because of the relative difference in solubilities of the alkali metal salts of the isomeric phenyl phenols the salts of para-phenyl phenol being in general less soluble than those of the ortho-isomer, a greater or less excess of free alkali may be required, depending upon the particular phenate to be made or used.

The hydrated phenyl phenate flake products thus prepared consist of whitish plate-like flakes, which may be screened or otherwise handled in ways usual for such materials. These flakes also are practically free flowing and may be stored in the usual manner for a considerable period of time without a tendency to cake or form hard crystalline chunks or become difficult to handle. My new products, in comminuted forms, may be conveniently dispensed in the various arts, dissolving in a minimum of time, thus greatly facilitating their use as compared with the products formerly provided, constituted of a caked crystalline mass.

Other modes of applying the principle of my invention may be employed instead of the ones explained, change being made as regards the methods herein disclosed or the materials employed, provided the steps or ingredients, or the equivalent of such stated steps or ingredients, stated by any of the following claims be employed.

I therefore particularly point out and distinctly claim as my invention:—

1. The method of preparing a solid form of a hydrated alkali metal phenyl phenate, which comprises preparing a liquid mixture of such salt and water in any proportion within the composition range entirely solidifiable by cooling without the separation of a mother liquor, and cooling said mixture to solidify same.

2. The method of preparing a comminuted form of a hydrated alkali metal phenyl phenate, which comprises preparing a liquid mixture of such salt and water in any proportion within the composition range entirely solidifiable by cooling without the separation of a mother liquor, cooling said mixture to solidify same and then dividing the solid so obtained into particles.

3. The method of preparing a flake form of solid a hydrated alkali metal phenyl phenate, which comprises preparing a liquid mixture of such salt and water in any proportion within the composition range entirely solidifiable by cooling without the separation of a mother liquor, and flaking said mixture.

4. In a method of preparing a solid form of a hydrated alkali metal phenyl phenate, the steps which consist in preparing a hot liquid mixture of said salt and water by reacting a phenyl phenol with at least an equimolecular proportion of an alkal metal hydroxide, the latter being in aqueous solution of such concentration as to form fused hydrated alkali metal phenyl phenate containing equivalent water of crystallization within the range in which said mixture is entirely solidifiable by cooling without the separation of a mother liquor, and cooling said mixture to solidify same.

5. In a method of preparing a solid form of a hydrated alkali metal phenyl phenate, the steps which consist in preparing a hot liquid mixture of such salt and water by reacting a phenyl phenol with at least, but not greatly in excess of, an equimolecular proportion of an alkali metal hydroxide, the latter being in aqueous solution of such concentration as to form a fused hydrated alkali metal phenyl phenate containing between one and five molecules of water of crystallization, and flaking said mixture.

6. In a method of preparing a hydrated sodium ortho-phenyl phenate in flake form, the steps which consist in preparing a hot liquid mixture of said salt and water by reacting ortho-phenyl phenol with at least, but not greatly in excess of, an equimolecular proportion of sodium hydroxide, the latter being in aqueous solution of such concentration as to form fused hydrated sodium ortho-phenyl phenate containing approximately three molecules of water of crystallization, and flaking said mixture.

7. In a method of preparing hydrated potassium ortho-phenyl phenate in flake form, the steps which consist in preparing a hot liquid mixture of said salt and water by reacting ortho-phenyl phenol with at least, but not greatly in excess of, an equimolecular proportion of potassium hydroxide, the latter being in aqueous solution of such concentration as to form fused hydrated potassium ortho-phenyl phenate containing approximately two molecules of water of crystallization, and flaking said mixture.

8. In a method of preparing hydrated sodium meta-phenyl phenate in flake form, the steps which consist in preparing a hot liquid mixture of said salt and water by reacting meta-phenyl phenol with at least, but not greatly in excess of, an equimolecular proportion of sodium hydroxide, the latter being in aqueous solution of such concentration as to form fused hydrated sodium meta-phenyl phenate containing approximately three molecules of water of crystallization, and flaking said mixture.

9. As a new product, a hydrated alkali metal phenyl phenate in flake form.

10. As a new product, sodium ortho-phenyl phenate in flake form.

11. As a new product, hydrated potassium ortho-phenyl phenate in flake form.

12. As a new product, hydrated sodium meta-phenyl phenate in flake form.

13. As a new product, a hydrated alkali metal phenyl phenate in flake form containing from one to five molecules of water of crystallization.

14. As a new product, a hydrated alkali metal phenyl-phenate in flake form containing from one to five molecules of water of crystallization and a relatively small amount of free alkali.

15. As a new product, sodium ortho-phenyl phenate in flake form containing approximately three molecules of water of crystallization.

16. As a new product, sodium ortho-phenyl phenate in flake form containing approximately three molecules of water of crystallization and a relatively small amount of free alkali.

17. As a new product, potassium ortho-phenyl phenate in flake form containing approximately two molecules of water of crystallization.

18. As a new product, potassium ortho-phenyl phenate in flake form containing approximately two molecules of water of crystallization and a relatively small amount of free alkali.

19. As a new product, sodium meta-phenyl phenate in flake form containing approximately three molecules of water of crystallization.

20. As a new product, sodium meta-phenyl phenate in flake form containing approximately three molecules of water of crystallization and a relatively small amount of free alkali.

Signed by me this 29th day of November, 1930.

WILLIAM H. WILLIAMS.

CERTIFICATE OF CORRECTION.

Patent No. 1,878,082. September 20, 1932.

WILLIAM H. WILLIAMS.

It is hereby certified that error appears in the printed specification of the above numbered patent requiring correction as follows: Page 1, line 53, for the misspelled word "hydrolzes" read "hydrolyzes"; page 3, line 128, claim 3, for "solid a" read "a solid"; page 4, line 9, claim 4, for "alkal" read "alkali"; and line 68, claim 10, before "sodium" insert the word "hydrated"; and that the said Letters Patent should be read with these corrections therein that the same may conform to the record of the case in the Patent Office.

Signed and sealed this 3rd day of January, A. D. 1933.

(Seal)

M. J. Moore,
Acting Commissioner of Patents.